Figure 3A:
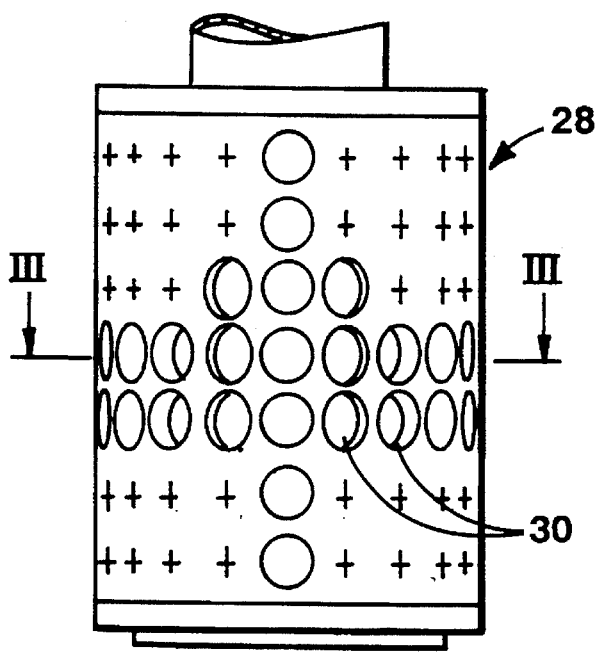

United States Patent
Özmerih

[11] Patent Number: 5,593,043
[45] Date of Patent: Jan. 14, 1997

[54] ROTOR FOR MECHANICAL AIR CLASSIFIERS

[75] Inventor: Levent Özmerih, Trondheim, Norway

[73] Assignee: Sinvent A/S, Trondheim, Norway

[21] Appl. No.: 448,415

[22] PCT Filed: Nov. 30, 1993

[86] PCT No.: PCT/NO93/00179

§ 371 Date: Jul. 19, 1995

§ 102(e) Date: Jul. 19, 1995

[87] PCT Pub. No.: WO94/12290

PCT Pub. Date: Jun. 9, 1994

[30] Foreign Application Priority Data

Dec. 1, 1992 [NO] Norway .................................. 924635

[51] Int. Cl.$^6$ ........................................ B07B 1/22
[52] U.S. Cl. ..................... 209/303; 209/22; 209/397
[58] Field of Search ............................ 209/713, 714, 209/721, 303, 22, 23, 397

[56] References Cited

U.S. PATENT DOCUMENTS

| | | | |
|---|---|---|---|
| 1,592,717 | 7/1926 | Breneman | 209/303 X |
| 1,958,726 | 5/1934 | Sturtevant | 209/139 |
| 2,006,867 | 7/1935 | Mjolsness | 209/303 X |
| 2,318,249 | 5/1943 | Mjolsness | 209/303 X |
| 2,709,500 | 5/1955 | Carter | 183/77 |
| 2,747,687 | 5/1956 | Carter | 183/77 |
| 2,793,847 | 5/1957 | Steele | 209/303 X |
| 4,477,339 | 10/1984 | Whaley et al. | 209/22 |
| 4,487,695 | 12/1984 | Connolly | 209/303 X |

FOREIGN PATENT DOCUMENTS

| | | |
|---|---|---|
| 82993 | 8/1895 | Germany . |
| 2448577 | 4/1975 | Germany . |
| 2224674 | 5/1990 | United Kingdom . |
| 0546458 | 6/1993 | WIPO . |

*Primary Examiner*—D. Glenn Dayoan
*Attorney, Agent, or Firm*—Fish & Richardson P.C.

[57] ABSTRACT

A rotor for mechanical air classifiers of the type having a hollow cage-like rotor is provided with a plurality of entering openings for air and classified material, the entering openings being generally equidimensionally shaped.

4 Claims, 5 Drawing Sheets

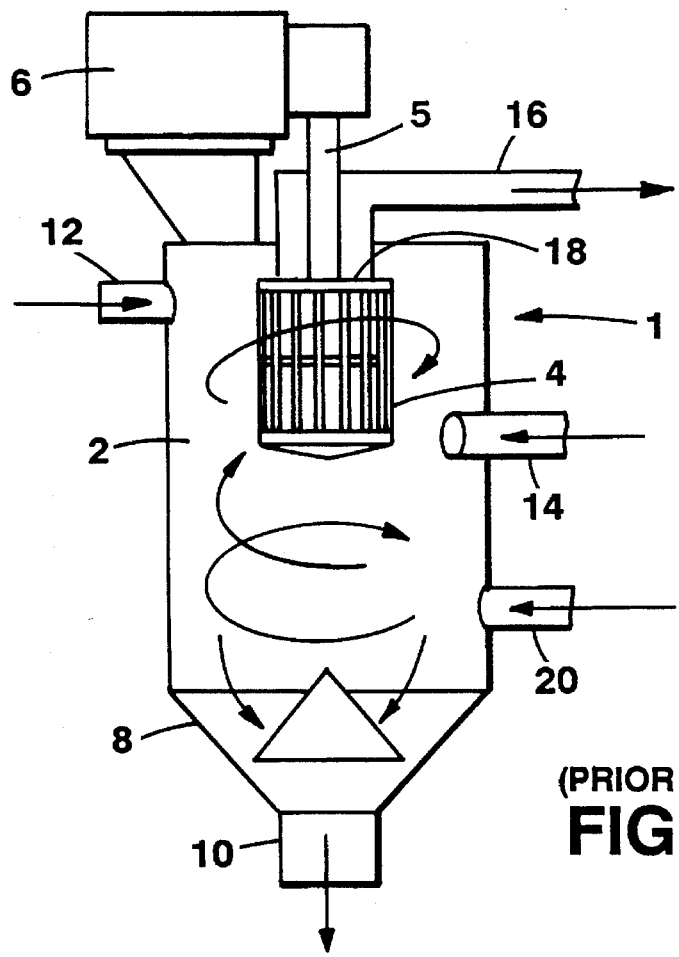
(PRIOR ART)
FIG. 1
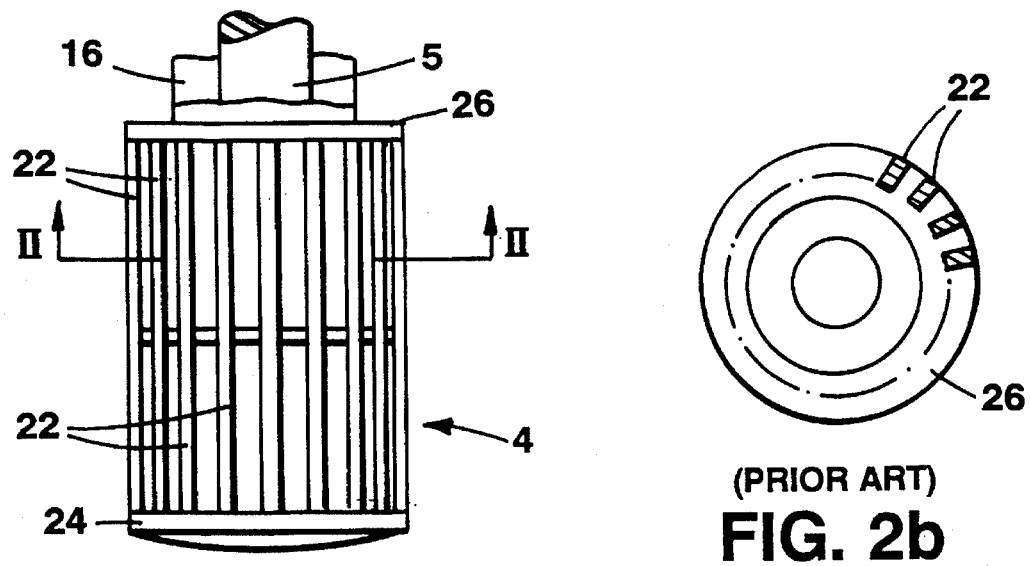
(PRIOR ART)
FIG. 2a
(PRIOR ART)
FIG. 2b

ROTOR FOR MECHANICAL AIR CLASSIFIERS

The present invention relates to a rotor for mechanical air classifiers or separators of the kind utilised for handling powdered and granular materials in order to separate fine particles from coarser particles. Such classifiers comprise in general a housing with a chamber, in which a cage-like rotor is rotatably supported. The material to be classified or separated is introduced into the chamber together with air, or is introduced separately through one or more feeding points or openings. The air together with the classified part of the material is sucked in through the rotor and is from there discharged axially from the chamber.

Such classifiers are used for production and classification of fine powderous materials used as raw material for abrasives, chemicals, pharmaceuticals, toners, pigments and colourants, high technology ceramics components, coating powders, fillers, cement raw materials, micronised minerals and metallurgical powders, etc.

The rotors are either used in classifiers to separate fine particles from a previously prepared powder, or constitute parts of integrated classifiers in powder production equipment like jet mills, ball mills, vibratory mills, high pressure mills etc.

Mechanical air classifiers utilize the principles of separation by centrifugal and/or drag forces.

A main component in a such classifier is a cage-like rotor which can be rotated around an axis at any desired speed in the classification chamber. Depending on the rotation speed or the "tip speed" of the rotor surface and the drag forces and centrifugal forces acting on the mixture of air and particles, some particles, or fractions of particles, will enter the rotor and leave the system axially through the rotor as a very finally divided product. The coarser particles not captured by the rotor are removed from the classifier chamber as rejects or may alternatively be micronized further in the system.

As far as one has been able to ascertain, all types of conventional rotors are built with a plurality of longitudinal, substantially flat blades or pins, placed axially around the circumference of two or more longitudinally spaced circular plates or rings which thereby form the respective ends of the rotor unit.

The rotors may be positioned either horizontally or vertically, largely depending upon the kind of classifier involved. As mentioned, some classifiers also include micronizer equipment. Most of the known types of rotors have a uniform, cylindrical shape, but some are conically shaped and still some present a combination of cylindrical and conical shape. In any case, the openings in the rotor surface are in conventional rotors presented as longitudinal apertures having rectangular or more or less rhombic form, if a conical rotor shape is used.

In order to provide additional support for the blades of pins in the rotor, some rotors, especially larger rotors, are provided with intermediate partition blades between the end supports in order to stiffen the blades which, as will be understood, rotate at high speeds, and also to stabilize the flow of particles.

The principle aim of the present invention has been to improve the design of rotors for mechanical air/powder classifiers in order to obtain higher yields, i.e. increased specific capacities and improved classification of the material, and finer products.

A further object of the invention is to develop a rotor design with improved possibilities for varying the product finenesses, respectively the degree of classification for various sizes of classifier apparatus.

A further object of the invention is to provide a rotor design which is easier to produce and which render improved possibilities regarding variation of the desired classification.

Prior to the development of the invention, the inventor carried out various theoretical and practical studies, which terminated in the conclusion that not only the size but the configuration of the openings or apertures in the rotor constitute a critical parameter for the operation of the rotor and thereby the classification.

A principal feature of the invention rests in the discovery that the apertures or openings in the rotor should not have the conventional longitudinal usually axially extending shape, but should on the contrary be given a more or less "equidimensional" shape, for instance be circular, square, triangular, trapezoid, polygonal and the like, in other words, having a substantial constant cross-section or diameter, i.e. close width and length.

Trials have verified that optimal results are usually obtained when using circular or substantially circular apertures, and with gradually decreasing improved results proportional with the length of the apertures relative to the width.

Other prevailing factors will, however, also affect the results. Thus, the size of the aperture will influence on the classification of the material and also other factors will play a role, such as the characteristics of the granular or powderous material to be classified, the size and velocity, i.e. the tip speed of the rotor, the mixing ratio between air and material and of course the size and configuration of the rotor and rotor chamber, the air pressures and velocities etc.

The granular or powderous material with partly coarser, partly finer particles will be constantly subjected to various counteracting forces, such as centrifugal forces, dynamic forces, drag forces, pressure forces etc. However, the smaller particles will more easily be entrained and arrested in the openings, and from there flow into the center space in the rotor and leave the system as classified powdered material, while the coarser and heavier particles will be rejected at the rotating surface plane of the rotor, and therefore not enter into the rotor.

It seems that when coarser particles arrive in between the opposite sides between any two of the rotor elements, such particles attain a tendency to move sideways and thereby receive one travelling component pointing inwards towards the centre of the rotor, and one travelling component pointing laterally or axially along the rotor, a fact which evidently in many cases results in that some of the coarser particles enter the rotor and thereby increase the average size of the classified products. This phenomenon is enhanced by the fact that the air stress through the rotor openings are directed somewhat obliquely due to the discharge outlet located at one end of the rotor.

The inventor acknowledges that an effective remedy to prevent the coarser particles from moving radially inwards through the openings, simply is to generally shorten the length of the openings and thereby presumably reduce the length of sideways travel of the coarser particles. Thereby the coarser particles are more effectively rejected and will ultimately accumulate, usually at the bottom part of the classifier chamber, from where they can be discharged from the classifier chamber or by special means be further crushed or disintegrated before a new being transported by the air stream upwards to the rotor in a "second round".

The practical conclusion of the disclosure made by the inventor is that rotors for mechanical air classifiers should not be made with longitudinal blades and the like supported between opposed sheaves, but rather be made with cylindrical tube or pipelike surfaces, provided with a plurality of more or less equidimensional apertures or openings.

As mentioned before, the absolute requirements to utilize openings with a more or less equidimensional configuration, will not be absolute in regard rotors with very small openings, for instance openings normally having a shortest dimension of approx. 3 mm, since with such small openings one can obtain good results with more longitudinal openings.

As the fineness of the fine products increase with the speed of the rotors, applying higher speeds seems to be a solution. However, in this case, either high wear on the classified parts due to high speeds involved will occur, or the construction of the system and the materials used become very expensive for a practical application. Therefore, a certain speed is not usually exceeded in practice.

One other general way is employing small diameter rotors, which provide finer products than larger diameter rotors. However, in this case, the specific surface area of each rotor will be relatively small, which will in return require a big number of units for a given capacity. Although employing a number of small diameter rotors simultaneously in the same classification chamber seems to be a solution for this case, this again will be very expensive as it will require more precision, more parts and more maintenance.

Thus, decreasing the rotor diameters for finer products does not provide practical solutions for most cases, other than a few applications which demand either very low capacities or produce very expensive products which will not be effected by high costs.

Classifier rotors in accordance with the invention will provide the following advantages, compared with conventional rotors;

Achieving finer products than is possible at present.

Achieving same fine products at slower speeds. Usually, they require about half or even one third of the tip speeds required for the conventional rotors. This in return means much less wear on the classifier part as wear is directly and exponentially proportional to speed. Also, the power consumption for rotating the rotor will be much lower for rotors in accordance with the invention.

Achieving higher specific capacities per unit rotor openings area for the same fine product.

Providing the use of bigger diameter rotors. Assuming the possibility of employing 3-4 times bigger diameter rotors for the same fine product, this will in practice mean to provide a total surface area 9-16 times bigger that that for the small diameter rotor, considering both rotors having similar ratios of rotor length to diameter. This again will increase the total capacity of a rotor according to the invention in the same proportion, avoiding the necessity of using a number of separate units, or multiple rotors in the same classifier, for the same capacity.

Providing the construction and use of longer rotors, due to its even distribution of material and air flow through the total length of the rotor. This will be one other factor for providing larger specific surface and more capacity for a rotor having the same diameter as the conventional rotor.

Providing longer life for rotors, as they will have less wear due to lower speeds.

Summing up, one can conclude that two very specific design features make the rotors in accordance with the invention superior to existing conventional rotors:

Rotors in accordance with the invention have round or equidimensional openings rather than long apertures as in conventional rotors. By round or equidimensional opening is meant openings having the following characteristics:

Circles, squares, triangles, trapezoids, ellipses and ellipsoids, polygons (like pentagonal, hexagonal, octagonal etc.) and short rectangular (**) and elongated openings. When applying round and equidimensional openings, we should demand that it will cover all diameters of rotors and all sizes of openings, regardless of any limits or proportions.

(**) By the expression short rectangular and elongated openings is referred to some special conventional rotors provided with partition plates or rings positioned vertically to the main axis of the rotor. Such plates are used partly for providing an additional support for the blades or pins, and for providing a stabilisation of the flow into the rotor, such openings may attain the form of a relatively short rectangle, in some cases with slightly conical, elongated openings. Such partition plates will apparently also influence on the particle flow, but the exact effects are not clarified.

The openings in the radial direction may be either straight which means having same dimensions both on the outer and inner surface of the rotor, or diverging or converging radially which means that one of the openings will be bigger than the other. For the diverging or converging case, we consider the larger end of the opening when calculating the length to width proportions.

Especially for larger diameter rotors which are mostly used for production of cement and similar rather coarse powders in large volumes, some producers place their partition rings as to create rectangles or openings having length to width ratios of about 3:1 or even coming closer to 2:1.

As to the question of which opening relationship fall within the scope of the present invention, even though the openings are not quite equidimensional but for instance are elliptic or short rectangular or any other elongated shape, the inventor has empirically arrived at the following mathematical parameters:

For all rotors which have an outer diameter of 100 mm and bigger, the following relation between the shortest and the longest side or axis of the openings will define the scope of the invention:

$$L/W = 30/W + 1.5$$

where:

L/W is the ratio of the Length to Width of the openings on the rotor, and

W (Width) is the dimension in mm of the shortest side or the shortest axis of the openings on the rotor, and L (Length) is the dimension in mm of the longest side or the axis of the openings on the rotor.

This relation provides a bigger length/width ratio for small openings and smaller ratio of L/W for bigger openings.

For illustration purposes, one shall in the following present some practical examples of rotors and rotor openings for some various rotor embodiments.

EXAMPLE I

In case of a rectangular or elliptical opening with the shortest side or axis (W) being 10 mm, the ratio of Length to Width will be:

$$L/W = 30/10 + 1.5 = 4.5$$

Therefore, the longest side or axis (L) should be bigger than 4.5×10=45 mm. Thus, the minimum opening size on the rotor will be larger than 10×45 mm.

EXAMPLE II

For rotors which have outer diameters of less than 100 mm:

Usually the openings on the rotor become smaller, together with the decreasing rotor diameter. Therefore small diameter rotors have rather small openings, but this is not a definite rule.

In case of a rectangular or elliptical opening where the shortest side or axis (W) is 20 mm, the ratio of the Length/Width will be:

$$L/W=30/20+1.5=3.0$$

Therefore, the longest side or axis (L) should be bigger than 3.0×20=60 mm. Thus, the minimum opening size on the rotor will be larger than 20×60 mm.

In this category one should differentiate between two possibilities as follows:

EXAMPLE III

For rotors which have their outer diameters smaller than 100 mm and having the shortest side or axis (W) of openings being equal to or less than ⅕ of the rotor diameter, the same general relation as above where L/W=30/W+1.5 is demanded. Therefore, as an example if a rotor of 80 mm is involved, ⅕ of this diameter will correspond to 16 mm. If it is desirable to use an opening for the shortest side or axis (W) of 10 mm, which is smaller than ⅕ of the rotor diameter, the ratio will in accordance with the invention be:

$$L/W=30/10+1.5=4.5.$$

The corresponding longest size or axis (L) of the openings will therefore be longer than 4.5×10=45 mm.

Thus, the minimum opening size on the rotor will be larger than 10×45 mm.

EXAMPLE IV

For rotors which have their outer diameters smaller than 100 mm and having the shortest side or axis (W) of openings being larger than ⅕ of the rotor diameter, one demands the minimum ratio of L/W not being less than 2.5.

Assuming the same example for a rotor of 80 mm diameter, if the shortest side or axis (W) of 20 mm is to be used, which is larger than ⅕ of the rotor diameter, the corresponding longest side or axis (L) of the openings should be longer than: 20×2.5=50 mm.

Thus, the minimum opening size on the rotor will be larger than 20×2.5=50 mm.

Figure 3B:
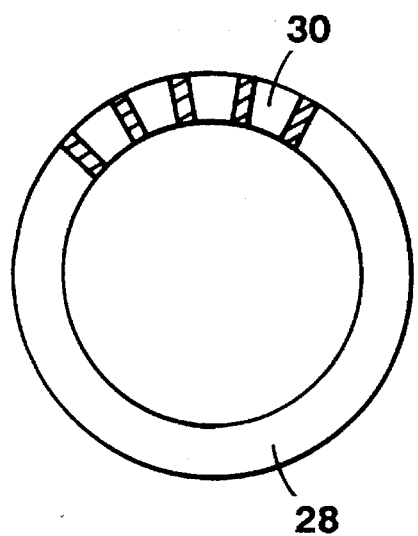
Figure 4A:
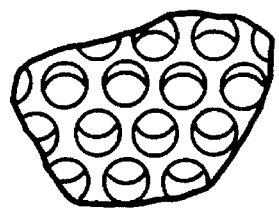
Figure 4B:
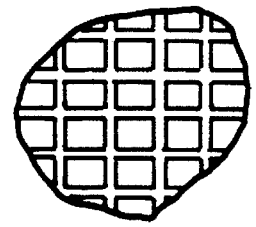
Figure 4C:
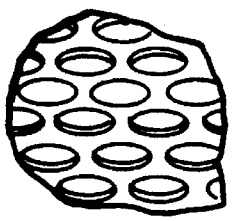
Figure 4D:
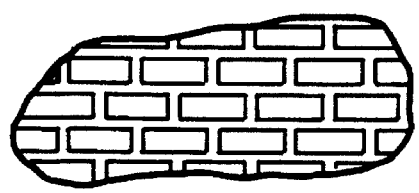
Figure 5A:
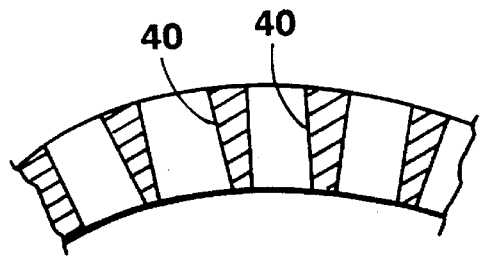
Figure 6A:
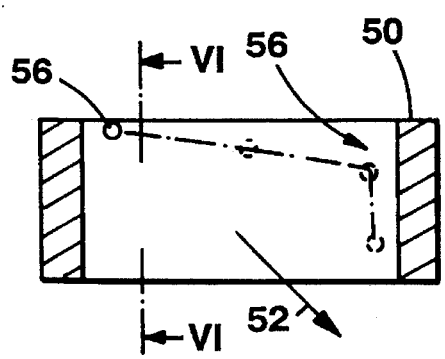

The invention shall in the following be described in connection with the attached drawings, which illustrate some types of conventional rotors, and some embodiments of rotors in accordance with the present invention, and in which:

FIG. 1 shows a section through a simple version of a classifier apparatus, equipped with a vertically placed conventional rotor, FIGS. 2a and 2b show a side view and a sectional view along plane II—II, respectively, of a conventional rotor, FIGS. 3a and 3b show a side view and a sectional view along plane III—III in FIG. 3a, of a rotor in accordance with the invention, FIGS. 4a, b, c and d are detail views in an enlarged scale, illustrating some embodiments of rotor openings in accordance with the invention, FIGS. 5a and b show fragmentary, transverse sectional detail views, illustrating two types of openings in a rotor in accordance with the invention, as straight openings and converging-diverging openings, FIGS. 6a, b and c are detailed schematic views in an enlarged scale, showing a longitudinal view, a side view and a sectional view along plane VI—VI shown in FIG. 6a, through an opening in a conventional rotor, illustrating a possible travel path of a particle.

Figure 7:
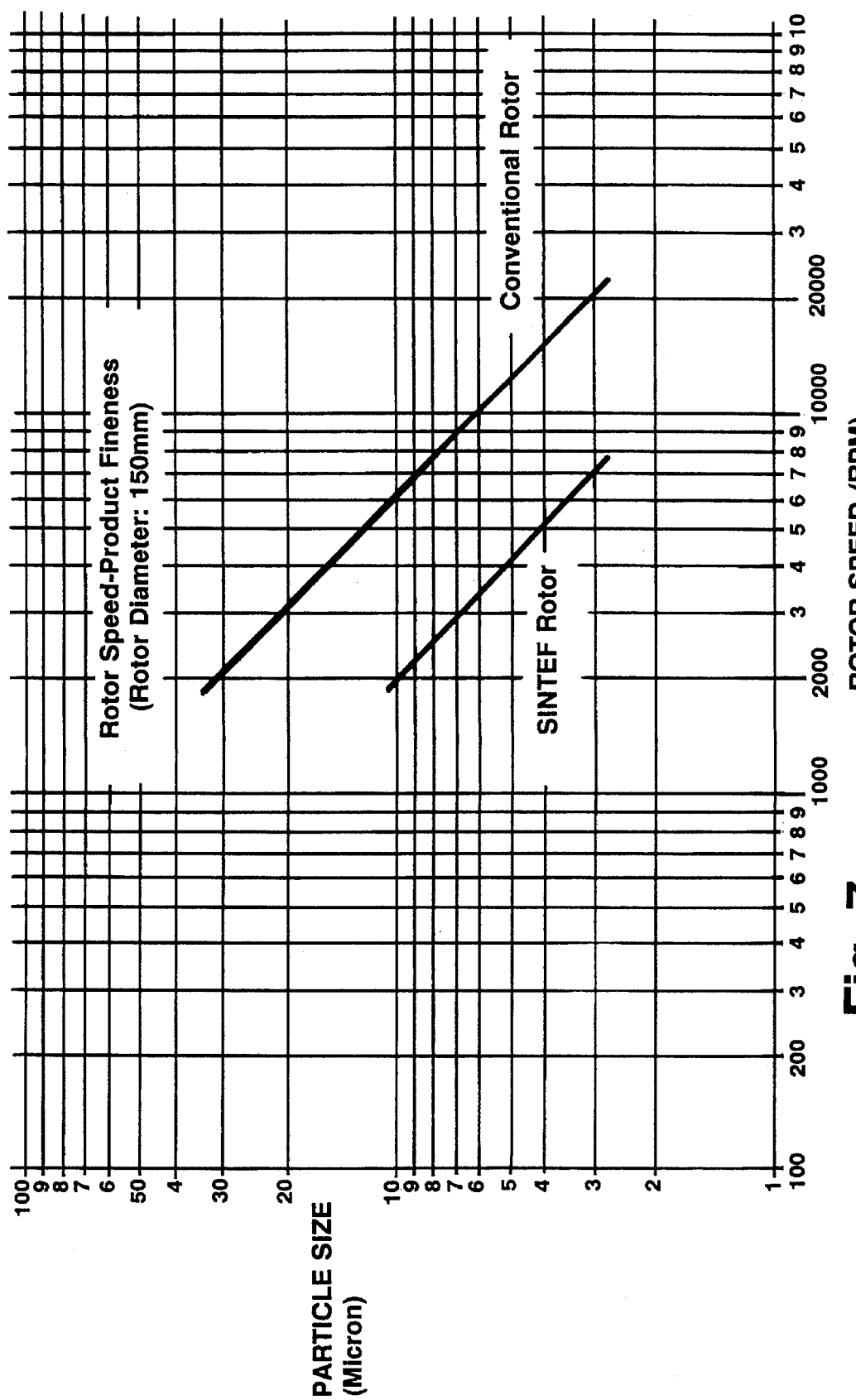
Figure 8:
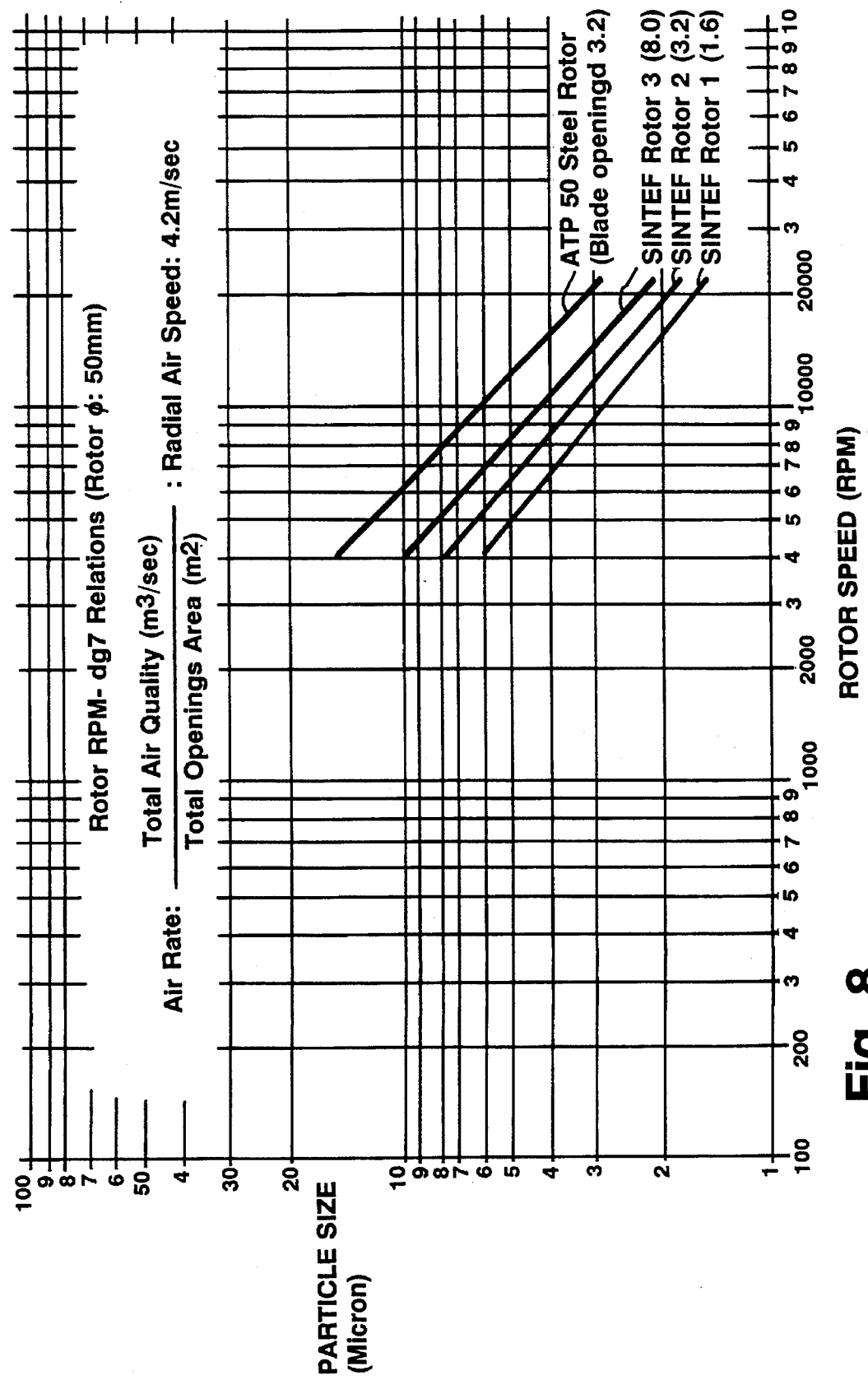

FIG. 7 is a diagram illustrating the production fineness at varying rotor speeds in regard a conventional rotor of 150 mm diameter, compared with a rotor in accordance with the invention, and FIG. 8 is a diagram illustrating the fineness of the product in regard a conventional rotor or 50 mm diameter with a specific blade opening, compared with three varying rotors in accordance with the invention, likewise with varying opening sizes.

FIG. 1 shows a schematic sectional view through a conventional air classifier or separator. The separator comprises a housing with a vertically extending cylindric chamber 2, in which is rotatably supported a rotor 4 with a drive shaft passing up through the housing wall and connected to a motor 6. The chamber is usually given a conically tapered lower end 8, ending in a central bottom outlet 10 to catch up falling material. A mixture of air and granular/powderous material is fed through some other inlet leading into the chamber, while in the middle of the chamber, one may arrange a tangential inlet 14 for socalled primary air providing a strong, circular stream around the rotor. On the top of the chamber is arranged an outlet 16 for classified or separated fine particles which constitute the product of the separator. This outlet extends down and circumscribes the upper open end 18 of the rotor 4. Further down in the chamber is usually arranged an additional air inlet 20 for introduction of a secondary air stream, which accomplishes a secondary or an additional separation of the material, such that smaller particles are conveyed upwards to the rotor zone in the chamber.

In operation, the air stream blown in through the various inlets will move around in the separator chamber, and from there be blown in through the openings between the rotor blades, and will leave the separator through the outlet 16. The powderous material fed into the chamber will be violently dispersed by the air flow entering the inlet 14 and 20 and partly be injected into the turbulent air flow between the rotor blades. In the separating gaps or openings between the blades, the socalled "out size" of the particles is mainly defined by the balance between prevailing centrifugal and drag force components. Fine particles are drawn into the rotor and moved vertically upwards with the moving air out through the outlet. The coarser particles are rejected from the rotor surface and undergo a substantially downward movement towards the bottom outlet 10 in the chamber. However, by means of the secondary tangential inlet air flow through the inlet 20, the falling coarser particles will be subjected to a whirling, spirally shaped air flow, by which a secondary separation takes place, so that residual fine particles will be whirled upwards and partly be sucked into the rotor. By positioning a conically shaped member 8 as shown, a such second separation phase is facilitated.

There exists a great variety of such air classifiers or separators utilizing high speed rotors, provided with inlet openings, forming inlet for the finer part of the particles. Most separators of this type have cylindric rotors, but in some types are used conically shaped rotors which are downwardly tapered, but all known rotors have in common that the rotor comprises a number of axially extending pins or blades forming therebetween longitudinal slits or openings.

FIGS. 2a and 2b show a side view and a sectional view through a typical rotor of conventional type. The rotor 4 shown comprises a plurality of circumferentially arranged mutually spaced blades 22, the opposite ends of which are attached to ring members 24,26. One end, usually the bottom end, is basically closed, while the other end, usually the upper end, is open, and communicates into the outlet for fine products. This outlet encompasses the drive shaft 5 for the rotor, which outside the separator housing is connected to the motor drive 6, such that the rotor can be rotated at high speeds, for instance up to 22.000 rpm for 50 mm diameter rotors (60 m/sec. tip speed). The rotor blade construction appears best from the cross-sectional view 2b, showing blades extended radially. In some rotor types, the blades extend freely between end plates, while some rotors are provided with one or more dividing plates, which may shorten the axial length of the opening between the blades. The purpose of such dividing plates is to strengthen or rigify the blade construction, and to stabilize the air and particle flow into the rotor. All known rotors for separators of this kind are provided with such blades or pins presenting longitudinal openings between the blades.

The radial thickness of the rotor wall is not especially critical, although there will always exist a certain optimum relation for this parameter. The rotor wall thickness will otherwise of course depend upon the size of the rotor and the particular configuration of the openings. As a "rule of the thumb", one might say that the thickness of the rotor wall should as a rule not be less than the diameter or longest dimension or side of the opening.

FIG. 3a and 3b show a side view and a cross-sectional view, respectively, of a simplified version of a classifier rotor 28 in accordance with the invention, the surface of which as shown is provided with a pattern of circular openings or apertures 30. As discussed before, the use of circular openings constitute an optimal solution in regard fineness and/or capacity of the rotor. A rotor in accordance with the invention can be made from a solid or integral blank of metal or for instance ceramic material. However, a rotor in accordance with the invention may alternatively be made from an initially plateshaped blank of metal or steel which is provided with the desired pattern or apertures, and thereafter by rolling or otherwise be formed into a cylindric, more or less pipeshaped member, and thereafter is joined by welding or otherwise together with a suitable finishing.

FIG. 4a, b, c and d illustrate some various embodiments of opening patterns and shapes which can be used on a rotor in accordance with the invention, showing circular, square, elliptic and short rectangular openings, respectively.

Figure 5B:
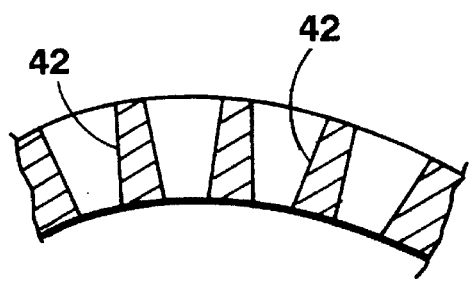

FIG. 5a and b show fragmentary, transverse sectional detail views, respectively, illustrating two types of openings which are applicable for a rotor in accordance with the invention. In FIG. 5a, the openings 40 constitute regular cylinders, i.e. a constant cross-section from the outside of the rotor to the inside. Such openings will appear when the openings for instance have been made by drilling. FIG. 5b hows an embodiment where the openings are inwardly conically tapered. Such openings can be made by utilizing a conically shaped drilling tool. The latter embodiment is considered to give a better classification.

In the following, one shall try to give a physical explanation why rotors in accordance with the invention give much better results than conventional rotors.

Figure 6B:
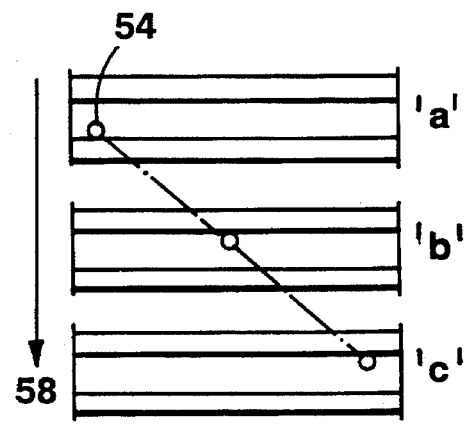
Figure 6C:
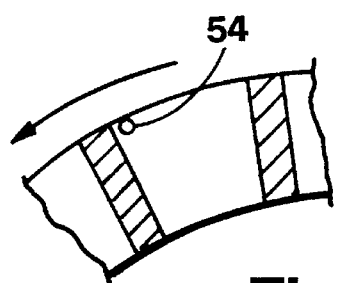

FIG. 6a, b and c are schematic views showing a typical conventional rotor, wherein FIG. 6a is a longitudinal, radial view through the space between two blades. FIG. 6b is a side view, seen directly towards the same blades in three different positions viewed against the centre of the rotor, while FIG. 6c is a cross-sectional view between the blades along the plane VI—VI shown in FIG. 6a. In operation, the rotor is rotating at high speed with a certain tip speed at the outside 50 of the rotor. The arrow 52 illustrates a usual direction of the air draught or suction created by the various air streams charged into the classifier chamber. Both the air and the classified material enter the rotor and leave the rotor through a discharge opening in one end. For this reason, the air stream will enter the rotor in an oblique manner, as indicated with the arrow 52. A coarser particle 54 which is caught between the blades will to some extent follow around with the rotor partly due to the ingoing draught, partly due to the turbulence between the blades, especially at the downstream edge of the blade, such as illustrated in FIG. 6c. The coarser particle will thus be subjected to various force components caused by centrifugal forces and drag forces, and will move partly inwards between the blades, and in many cases move partly sideways as illustrated in FIG. 6c, and may end up towards the other end of the longitudinal opening, and either be rejected out or be sucked into the rotor. The situation is further illustrated in FIG. 6b, showing the blade with the coarser particle 54 in three different rotational positions a, b and c. A shown, the particle 54 will move sideways or axially simultaneously as the rotor rotates in direction indicated with the arrow 58. This phenomenon apparently results in that a part of the coarser particles or coarser particles together with relatively small particles will enter the rotor instead of being rejected. Based upon this acknowledgement, the inventor shortened the length of the opening between the blades and made the important discovery that not only would a shorter or more "equidimensional" opening give a better classification as to fineness of the particles, but the specific capacity of the rotor was simultaneously increased. The latter fact may be due to the circumstance that by decreasing the tip speed for the same fine product, more particles close to critical size can and will enter direct or transversely into the rotor.

FIG. 7 and 8 are diagrams illustrating the production of various types of rotors in accordance with the invention, compared with which the production of similar conventional rotors under the same operational conditions.

The diagram shown in FIG. 7 refers to a conventional rotor and a rotor in accordance with the invention, both having a diameter size of 150 mm. The conventional rotor was built up with a plurality of radially pointed blades, while the rotor in accordance with the invention had circular openings with diameter of 8 mm. Along the ordinate or left side of the diagram are given logarithmic values of the particle size or fineness in micron with 97% uniformity, ($d_{97}$). Along the abscissa or horizontal side are given the rotor speeds, likewise in a logarithmic scale, the two linear curves or lines showing the results obtained. The distance between the two curves are illustrative for the difference in the results. To take some examples: If the production requires a particle size of 3 microns, this would with a Sintef rotor require a rotor speed of about 7000 rpm, corresponding to 60 m/sec. To obtain the same particle size with a conventional rotor, one must use an rpm of about 22000, or a tip speed of about 200 m/sec. This again would require a much more expensive classifier equipment, and still all moving part in the classifier would be subjected to much greater wear. Alternatively, with a Sintef rotor, the required particle size of 3 microns, require only a tip speed of 60 m/sec., implying that one could double the size or diameter of the rotor and thereby double the area of the rotor with a corresponding increase in the production or capacity of the rotor.

To take another example: If the possible rotational speed of the rotor is 3000, and a Sinter rotor is used, one can obtain classification with a particle size of 7 microns, while with a conventional rotor, the same apparatus would give a particle size of 20 microns. This illustrates that the improvements obtained with a Sintef rotor is more or less dramatic.

FIG. 8 is a similar diagram with a number of trials with rather small rotors, having a diameter of 50 mm. The uppermost line show the results obtained with a conventional rotor with blade openings of 3,2 mm, while the three lower lines show results with three different embodiments of Sintef rotors provided with circular openings with diameter of 8 mm, 3,2 mm and 1,6 mm, respectively. Here again is illustrated that all three types of Sintef rotors used give much better results than a conventional rotor.

It shall be added that while only cylindric rotors have been described and shown, the same practice and theory will cover other shapes of rotors, including conical rotors.

I claim:

1. Rotor for mechanical classifier apparatus for classifying particulate materials composed of a mixture of particles of various sizes, the mechanical classifier comprising a housing with a chamber, a hollow rotor disposed in the chamber and journalled for rotation about an axis, the rotor being an axially-symmetrical body with a circumferential wall, the wall defining a pattern of inlet openings for classified material, the material to be classified being imported into the chamber through inlet openings together with air subjected to certain excess pressure, resulting in that the air together with the classified part of the material composed of finer particles is sucked into the inside space of the rotor and from there is conveyed axially out of the rotor and thereby is discharged from the classifying apparatus, while the part of the material which substantially consists of coarser particles by gravity falls down to a lower part of the chamber and from there is discharged out of the housing, characterized in that the openings in the rotor wall are substantially circular, square, quadrangular, rectangular, or polygonal, and in that the radial thickness of the rotor wall is larger than the diameter of the circular openings, or at least larger than the smallest transverse dimension of the other opening configurations, and further characterized in that the relationship between the shortest and the longest side of axis of the openings are defined with the following formula:

$$L/W=30/W+1.5$$

for all values of L/W which are smaller than or equal to 4.0, where:

L/W is the relationship between length and width of the openings in the rotor, respectively, and W (width) is the dimension in millimeters of the shortest side or along the shortest axis of the opening or openings in the rotor, and L (length) is the dimension in millimeters of the longest side or along the longest axis of the opening or openings in the rotor.

2. Rotor in accordance with claim 1, characterized in that the openings have converging transverse area in radial direction from the outside or from the inside of the rotor wall.

3. Rotor in accordance with claim 1, wherein the radial wall thickness of the rotor is about 10% of the rotor diameter, characterized in that the maximum diameter or longest transverse dimension of the openings is approximately 10% of the rotor diameter.

4. Rotor in accordance with claim 3, wherein the maximum diameter or longest transverse dimension of the openings is less than 10% of the rotor diameter.

\* \* \* \* \*

UNITED STATES PATENT AND TRADEMARK OFFICE
CERTIFICATE OF CORRECTION

PATENT NO. : 5,593,043

DATED : January 14, 1997

INVENTOR(S) : Levent Ozmerih

It is certified that error appears in the above-identified patent and that said Letters Patent is hereby corrected as shown below:

Column 1, line 2, "utilised" should be --utilized--.

Column 1, line 34, "finally" should be --finely--.

Column 3, line 6, after "openings" insert --, for instance a relationship between the shortest and longest length up to about 4--.

Column 4, line 26, "relationship" should be --relationships--.

Column 5, line 50, "20 x 2.5 = 50" should be --20 x 50 mm--.

Column 6, line 28, after "through" insert --an inlet 12 at the top of the chamber or through, and after "fed" insert --in--.

Column 7, line 61, "hows" should be --shows--.

Column 8, line 28, "A" should be --As--.

UNITED STATES PATENT AND TRADEMARK OFFICE
CERTIFICATE OF CORRECTION

PATENT NO. : 5,593,043
DATED : January 14, 1997
INVENTOR(S) : Levent Ozmerih

It is certified that error appears in the above-identified patent and that said Letters Patent is hereby corrected as shown below:

Column 10, line 10, "of" should be --or--.

Signed and Sealed this

Twenty-third Day of March, 1999

Attest:

Q. TODD DICKINSON

Attesting Officer

Acting Commissioner of Patents and Trademarks